(12) United States Patent
Liu (10) Patent No.: US 10,091,846 B2
(45) Date of Patent: Oct. 2, 2018

(54) LED DRIVING SYSTEM AND ASSOCIATED CONTROL METHOD

(71) Applicant: Chengdu Monolithic Power Systems Co., Ltd., Chengdu (CN)

(72) Inventor: Bairen Liu, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/628,575

(22) Filed: Jun. 20, 2017

(65) Prior Publication Data

US 2017/0374713 A1  Dec. 28, 2017

(30) Foreign Application Priority Data

Jun. 24, 2016  (CN) .......................... 2016 1 0475145

(51) Int. Cl.
| | |
|---|---|
| *H05B 37/02* | (2006.01) |
| *H05B 33/08* | (2006.01) |
| *G05F 1/40* | (2006.01) |
| *G05F 1/618* | (2006.01) |
| *H02M 3/157* | (2006.01) |
| *H02M 3/158* | (2006.01) |

(52) U.S. Cl.
CPC ........... *H05B 33/0821* (2013.01); *G05F 1/40* (2013.01); *G05F 1/618* (2013.01); *H02M 3/157* (2013.01); *H02M 3/158* (2013.01); *H05B 33/0815* (2013.01); *H05B 37/0209* (2013.01); *Y02B 20/346* (2013.01)

(58) Field of Classification Search
CPC .......... G05F 1/40; G05F 1/618; H02M 3/157; H05B 33/0815; H05B 33/0821; H05B 37/0209; Y02B 20/346
See application file for complete search history.

(56) References Cited

U.S. PATENT DOCUMENTS

| | | | | |
|---|---|---|---|---|
| 7,843,148 B2* | 11/2010 | Gater | ..................... | G09G 3/342 |
| | | | | 315/291 |
| 8,232,743 B2* | 7/2012 | Chen | .................. | H05B 33/0818 |
| | | | | 315/232 |
| 9,035,566 B2 | 5/2015 | LeiDu | | |
| 9,144,126 B2* | 9/2015 | Raval | ................. | H05B 33/0818 |
| 9,185,757 B2* | 11/2015 | Boezen | ............. | H05B 33/0815 |
| 9,485,819 B2 | 11/2016 | Liu | | |

(Continued)

*Primary Examiner* — Alexander H Taningco
*Assistant Examiner* — Kurtis R Bahr
(74) *Attorney, Agent, or Firm* — Perkins Coie LLP (57) ABSTRACT

A LED driving system has an energy storage component receiving an input voltage, a power switch coupled between the energy storage component and a reference ground, a first output switch coupled between the energy storage component and a first output terminal, a second output switch coupled between the energy storage component and a second output terminal, and a control circuit, wherein the first output terminal produces a first output voltage to supply power for a first LED array, the second output terminal produces a second output voltage to supply power for a second LED array, the control circuit controls a duty cycle of the first output switch according to voltages at cathode terminals of multiple LED strings in the LED array and controls a duty cycle of the second output switch according to voltages at cathode terminals of multiple LED strings in the second LED array.

20 Claims, 5 Drawing Sheets

(56) References Cited

U.S. PATENT DOCUMENTS

| | | | | |
|---|---|---|---|---|
| 2010/0301764 A1* | 12/2010 | Liu | ................... | H05B 33/0818 |
| | | | | 315/250 |
| 2013/0107165 A1* | 5/2013 | Lin | ..................... | G09G 3/3406 |
| | | | | 349/61 |
| 2015/0267906 A1* | 9/2015 | Wilcox | ................ | F21V 23/003 |
| | | | | 362/311.02 |
| 2016/0255687 A1* | 9/2016 | Zhang | ................ | H05B 33/0818 |
| | | | | 315/210 |

* cited by examiner

LED DRIVING SYSTEM AND ASSOCIATED CONTROL METHOD

This application claims the benefit of CN application No. 201610475145.6, filed on Jun. 24, 2016, and incorporated herein by reference.

TECHNICAL FIELD

The present invention relates to electrical circuit, more particularly but not exclusively relates to a LED driving system and associated control method.

BACKGROUND

Light-emitting diodes (LEDs) are widely used in screen backlighting. Usually multiple LED strings are needed to light the screen. Nevertheless, in practical applications, different voltages are needed when each of the LED strings comprises a different number of LEDs. For example, a first LED string comprises 10 LEDs and a second LED string comprises 20 LEDs, then two different voltages are needed to respectively supply the first LED string and the second LED string. A common solution is using two independent switching circuits to produce two different voltages. But many components are needed in this traditional solution and it's hard to decrease the cost.

SUMMARY

It is one of the objects of the present invention to provide a LED driving system and associated control method.

One embodiment of the present invention discloses a LED driving system, having an input terminal configured to receive an input voltage, a first output terminal configured to provide a first output voltage for a first LED array, and a second output terminal configured to provide a second output voltage for a second LED array, wherein each of the first LED array and the second LED array comprises multiple LED strings coupled in parallel, wherein each of the LED strings in the first LED array has a cathode terminal and an anode terminal, and each of the LED strings in the second LED array has a cathode terminal and an anode terminal, the LED driving system comprising: an energy storage component, having a first terminal and a second terminal, wherein the first terminal is coupled to the input terminal of the LED driving system to receive the input voltage; a power switch, coupled between the second terminal of the energy storage component and a reference ground; a first output switch, coupled between the second terminal of the energy storage component and the first output terminal of the LED driving system; and a second output switch, coupled between the second terminal of the energy storage component and the second output terminal of the LED driving system; wherein when the power switch is on, the energy storage component is configured to store energy, when the power switch is off, the energy storage component is configured to release energy to the first output terminal and the second output terminal of the LED driving system alternately, wherein according to a minimum value of voltages at the cathode terminals of the multiple LED strings in the first LED array, the LED driving system is configured to control a duty cycle of the first output switch to adjust the first output voltage, and according to a minimum value of voltages at the cathode terminals of the multiple LED strings in the second LED array, the LED driving system is configured to control a duty cycle of the power switch to adjust the second output voltage, wherein the second output voltage is larger than the first output voltage.

Another embodiment of the present invention discloses a LED driving system, comprising: a first output terminal, a second output terminal, an energy storage component configured to receive an input voltage through its first terminal, a power switch coupled between a second terminal of the energy storage component and a reference ground, a first output switch coupled between the second terminal of the energy storage component and the first output terminal of the LED driving system, a second output switch coupled between the second terminal of the energy storage component and the second output terminal of the LED driving system, and a control circuit, wherein the first output terminal is configured to supply power for a first LED string and a second LED string, the second output terminal is configured to supply power for a third LED string and a fourth LED string, wherein each of the first LED string, the second LED string, the third LED string and the fourth LED string has a cathode terminal and an anode terminal, and the control circuit is configured to control a duty cycle of the first output switch according to the first LED string and the second LED string, the control circuit is configured to control a duty cycle of the second output switch according to the third LED string and the fourth LED string, wherein the first LED string comprises n LEDs coupled in series, the second LED string comprises n LEDs coupled in series, the third LED string comprises m LEDs coupled in series, the fourth LED string comprises m LEDs coupled in series, both m and n are natural numbers, m and n are larger than zero, m is larger than n.

Yet another embodiment of the present invention discloses a control method for a LED driving system, comprising: receiving an input voltage through an energy storage component, wherein the energy storage component is coupled to a reference ground via a power switch, the energy storage component is coupled to a first output terminal of the LED driving system through a first output switch in order to supply power for a first LED array, and the energy storage component is coupled to a second output terminal of the LED driving system through a second output switch in order to supply power for a second LED array, wherein the first LED array comprises multiple LED strings coupled in parallel, the second LED array comprises multiple LED strings coupled in parallel, wherein each of the LED strings in the first LED array has a cathode terminal and an anode terminal, and each of the LED stings in the second array has a cathode terminal and an anode terminal; controlling a duty cycle of the first output switch according to a minimum value of voltages at the cathode terminals of the multiple LED strings in the first LED array; and controlling a duty cycle of the power switch according to a minimum value of voltages at the cathode terminals of the multiple LED strings in the second LED array.

According to the embodiments of the present invention, the LED driving system can provide different voltages for the LED strings with a simple structure

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are described to provide a thorough understanding of the present invention, such as examples of circuits, components, and methods. These embodiments illustrated are exemplary, not to confine the scope of the invention. A person ordinary skilled in the art will recognize, however, that the invention can be implemented without one or more of the specific details. In other instances, well-known details are not shown or described to avoid obscuring the aspects of the invention. Some phrases are used in some exemplary embodiments. However, the usage of these phrases is not confined to these embodiments.

In the present application, a LED driving system with a simple structure can provide two different voltages to drive multiple LED strings, and the LED driving system comprises a power switch, a first output switch and a second output switch.

Figure 1:
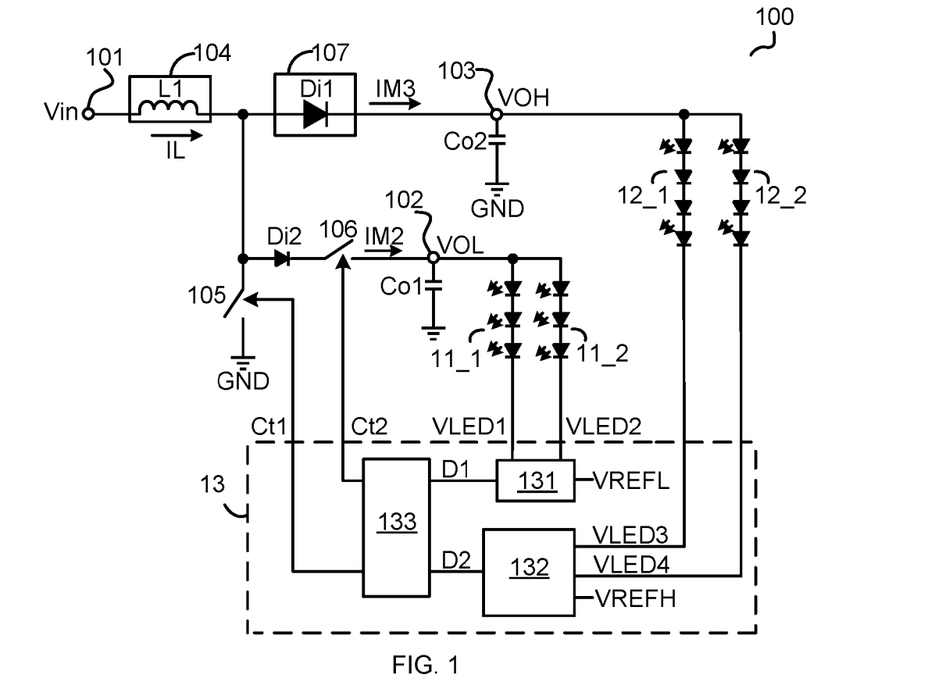
FIG. 1 schematically illustrates a circuit block diagram of a LED driving system 100 according to an embodiment of the present invention.

FIG. 1 schematically illustrates a circuit block diagram of a LED driving system 100 according to an embodiment of the present invention. The LED driving system 100 comprises: an input terminal 101 configured to receive an input voltage Vin, a first output terminal 102 configured to provide a first output voltage VOL, a second output terminal 103 configured to provide a second output voltage VOH, an energy storage component 104, a power switch 105, a first output switch 106, and a second output switch 107. Wherein the first output voltage VOL is smaller than the second output voltage VOH.

In one embodiment, the energy storage component 104 comprises an inductor L1, wherein the inductor L1 has a first terminal and a second terminal, the first terminal of the inductor L1 is coupled to the input terminal 101 to receive the input voltage Vin. The power switch 105 is coupled between the second terminal of the inductor L1 and a reference ground GND. The first output switch 106 is coupled between the second terminal of the inductor L1 and the first output terminal 102. The first output terminal 102 is configured to provide the first output voltage VOL for a first LED array, wherein the first LED array comprises multiple LED strings coupled in parallel, e.g. LED string 11_1 and LED string 11_2 as shown in FIG. 1, wherein each of the LED strings has an anode terminal and a cathode terminal, wherein both the anode terminals are coupled to the first output terminal 102 to receive the first output voltage VOL. One of ordinary skill in the art should know that in other embodiments, the first LED array can comprise multiple LED strings coupled in parallel, and the number of the LED strings is not confined to 2. And though each of the LED string 11_1 and LED string 11_2 comprises 3 LEDs coupled in series as shown in FIG. 1, one of ordinary skill in the art should know that in other embodiments, each LED string in the first LED array can comprise multiple LEDs coupled in series, and the number of the LEDs is not confined to 3.

The second output switch 107 is coupled between the second terminal of the inductor L1 and the second output terminal 103. The second output terminal 103 is configured to provide the second output voltage VOH for a second LED array, wherein the second LED array comprises multiple LED strings coupled in parallel, e.g. LED string 12_1 and LED string 12_2 as shown in FIG. 1, wherein each of the LED strings has an anode terminal and a cathode terminal, both the anode terminals are coupled to the second output terminal 103 to receive the second output voltage VOH. One of ordinary skill in the art should know that in other embodiments, the second LED array can comprise multiple LED strings coupled in parallel; the number of the LED strings is not confined to 2. And although each of the LED string 12_1 and the LED string 12_2 comprises 4 LEDs coupled in series as shown in FIG. 1, one of ordinary skill in the art should know that in other embodiments, each LED string in the second LED array can comprise multiple LEDs coupled in series, the number of the LEDs is not confined to 4. In one embodiment, each LED string in the first LED array comprises n LEDs coupled in series, each LED string in the second LED array comprises m LEDs coupled in series, wherein m and n are natural numbers, m and n are larger than 0, and m is larger than n, i.e. m>n>0. In one embodiment, the second output switch 107 comprises a diode Di1. In another embodiment, the second output switch 107 comprises a synchronous rectifier switch.

In one embodiment, the power switch 105, the first output switch 106 can be semiconductor devices, e.g. Metal Oxide Semiconductor Field Effect Transistor (MOSFET), Lateral Diffuse Metal Oxide Semiconductor (LDMOS), and Insulated Gate Bipolar Transistor (IGBT) and so on.

In one embodiment, a first output capacitor Co1 is coupled between the first output terminal 102 and the reference ground GND to store energy and keep the first output voltage VOL stable. In one embodiment, a second output capacitor Co2 is coupled between the second output terminal 103 and the reference ground GND to store energy and keep the second output voltage VOH stable.

When the power switch 105 is on, the first output switch 106 and the diode Di1 are off, the inductor L1 is configured to store energy. When the power switch 105 is off, based on switching states of the first output switch 106, energy stored in the inductor L1 is configured to be allocated respectively to the first output terminal 102 and the second output terminal 103 in order to supply power for the first LED array and the second LED array. For example, energy allocated to the first output terminal 102 is configured to increase when a duty cycle of the first output switch 105 increases. In one embodiment, when the power switch 105 and the first output switch 106 are off and the diode Di1 is on, energy stored in the inductor L1 is configured to be released to the second output terminal 103 through the diode Di1, wherein a current IM3 flowing through the second output switch 107 (Diode Di1) is equal to an inductor current IL, thus the second output capacitor Co2 is charged; When the power switch 105 is off and the first output switch 106 is on, the diode Di1 is off because the first output voltage VOL is smaller than the second output voltage VOH, energy stored in the inductor L1 is configured to be released to the first output terminal 102, wherein a current IM2 flowing through the first output switch 105 is equal to the inductor current IL, thus the first output capacitor Co2 is charged.

The LED driving system 100 further comprises a control circuit 13. The control circuit 13 is configured to work according to the multiple LED strings coupled in parallel in the first LED array, and the control circuit 13 is configured to control a duty cycle of the first output switch 106 according to a minimum value of a cathode voltage VLED1 and a cathode voltage VLED2, thus adjusting the first output voltage VOL, wherein the duty cycle of the first output switch 106 is a ratio of an on duration to a switching period of the first output switch 106. The control circuit 13 is configured to work according to the multiple LED strings coupled in parallel in the second LED array, e.g. configured to control the duty cycle of the power switch 105 according to a minimum value of a cathode voltage VLED3 and a cathode voltage VLED4, thus adjusting the second output voltage VOH, wherein the duty cycle of the power switch 105 is a ratio of an on duration to a switching period of the power switch 105.

In the embodiment as shown in FIG. 1, the control circuit 13 comprises a first duty cycle control loop 131, a second duty cycle control loop 132 and a logic circuit 133. The first duty cycle control loop 131 is coupled to the cathode terminal of the LED string 11_1 and the cathode terminal of the LED string 11_2 respectively to receive the cathode voltage VLED1 and the cathode voltage VLED2, and configured to produce a first duty cycle signal D1 based on the cathode voltage VLED1, the cathode voltage VLED2 and a first reference signal VREFL. The second duty cycle control loop 132 is coupled to the cathode terminal of the LED string 12_1 and the cathode terminal of the LED string 12_2 respectively to receive the cathode voltage VLED3 and the cathode voltage VLED4, and configured to produce a second duty cycle signal D2 based on the cathode voltage VLED3, the cathode voltage VLED4 and a second reference signal VREFH. The logic circuit 133 is configured to receive the first duty cycle signal D1 and the second duty cycle signal D2, and configured to produce a first switch control signal Ct1 to control the power switch 105, and configured to produce a second switch control signal Ct2 to control the first output switch 106. In one embodiment, the second reference signal VREFH is larger than the first reference signal VREFL.

The control circuit 13 is not confined to be coupled to the cathode terminals of the LED strings directly to receive voltages at the cathode terminals of the LED strings. In one embodiment, the control circuit 13 is configured to control the duty cycle of the power switch 105 via voltages across the LED strings and control the duty cycle of the first output switch 106 via currents flowing through the LED strings.

In one embodiment, the LED driving system 100 further comprises a diode Di2 with an anode and a cathode, wherein the anode of the diode Di2 is coupled to the second terminal of the inductor L1, the cathode of the diode Di2 is coupled to a first terminal of the first output switch 106, the other terminal of the first output switch 106 is coupled to the first output terminal 102. The diode Di2 is configured to prevent the current IM2 from flowing backward to the input terminal 101 via the inductor L1 and prevent the current IM2 from flowing backward to the reference ground GND via the power switch 105.

Figure 2:
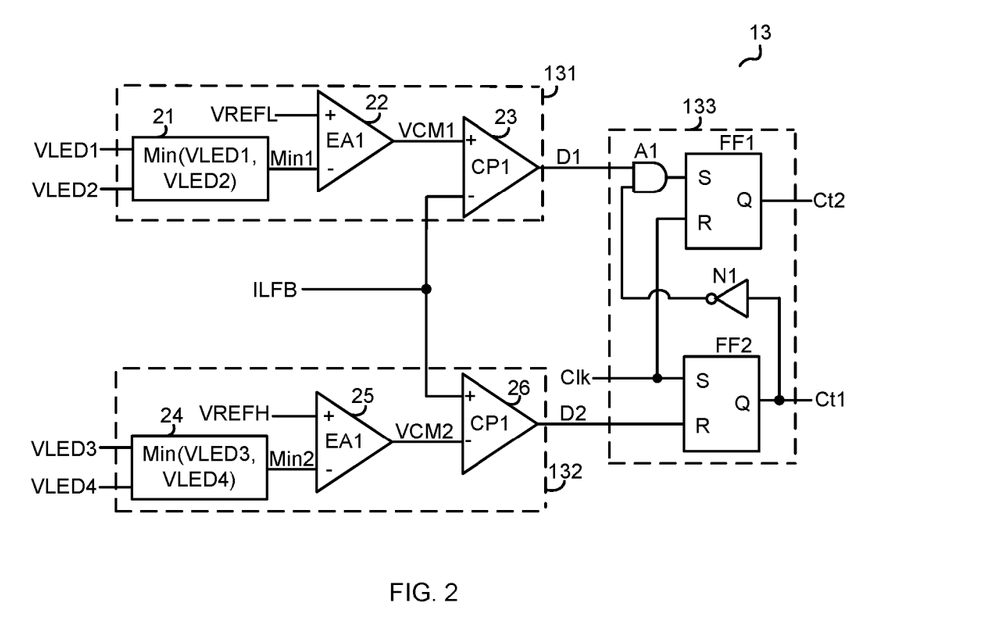
FIG. 2 schematically illustrates a control circuit 13 according to an embodiment of the present invention.

FIG. 2 schematically illustrates a control circuit 13 according to an embodiment of the present invention. In the embodiment as shown in FIG. 2, the first duty cycle control loop 131 comprises a first minimum value choosing circuit 21, a first error amplifying circuit 22 and a first comparator circuit 23. The first minimum value choosing circuit 21 comprises a first input terminal, a second input terminal and an output terminal, wherein the first input terminal is configured to receive the cathode voltage VLED1 of the LED string 11_1, the second input terminal is configured to receive the cathode voltage VLED2 of the LED string 11_2, the output terminal is configured to provide a first minimum value signal Min1 according to the cathode voltage VLED1 and the cathode voltage VLED2. The first error amplifying circuit 22 has a non-inverting input terminal, an inverting input terminal and an output terminal, wherein the non-inverting input terminal is configured to receive the first reference signal VREFL, the inverting input terminal is coupled to the output terminal of the first minimum value choosing circuit 21 to receive the first minimum value signal Min1; The first error amplifying circuit 22 is configured to amplify a difference value (VREFL−Min1) of the first reference signal VREFL and the first minimum value signal Min1, and configured to output a first error amplifying signal VCM1 via its output terminal. The first comparator circuit 23 has a non-inverting input terminal, an inverting input terminal and an output terminal, wherein the inverting input terminal is configured to receive an inductor current feedback signal ILFB, the non-inverting input terminal is configured to receive the first error amplifying signal VCM1, the first comparator circuit 23 is configured to produce the first duty cycle signal D1 based on a comparing result of the inductor current feedback signal ILFB and the first error amplifying signal VCM1, wherein the inductor current feedback signal ILFB is a feedback signal of the inductor current IL.

In the embodiment as shown in FIG. 2, the second duty cycle control loop 132 comprises a second minimum value choosing circuit 24, a second error amplifying circuit 25 and a second comparator circuit 26. The second minimum value choosing circuit 24 has a first input terminal, a second input terminal and an output terminal, wherein the first input terminal is configured to receive the cathode voltage VLED3 of the LED string 12_1, the second input terminal is configured to receive the cathode voltage VLED4 of the LED string 12_2, the output terminal is configured to provide a second minimum value signal Min2 according to a minimum value of the cathode voltage VLED3 and the cathode voltage VLED4. The second error amplifying circuit 25 has a non-inverting input terminal, an inverting input terminal and an output terminal, wherein the non-inverting input terminal is configured to receive the second reference signal VREFH, the inverting input terminal is coupled to the output terminal of the second minimum value choosing circuit 24 to receive the minimum value signal Min2, the second error amplifying circuit 25 is configured to amplify a difference value (VREFH−Min2) of the second reference value VREFH and the minimum value signal Min2, and configured to output a second error amplifying signal VCM2 via its output terminal. The second comparator circuit 26 has a non-inverting input terminal, an inverting input terminal and an output terminal, wherein the non-inverting input terminal is configured to receive the inductor current feedback signal ILFB, the inverting input terminal is configured to receive the second error amplifying signal VCM2, the second comparator circuit 26 is configured to produce the second duty cycle signal D2 based on a comparing result of the inductor current feedback signal ILFB and the second error amplifying signal VCM2.

In one embodiment, according to the first duty cycle signal D1, the logic circuit 133 is configured to provide the second switch control signal Ct2 to control the duty cycle of the first output switch 106, thus adjusting the first output voltage VOL; According to the second duty cycle signal D2, the logic circuit 133 is configured to provide the first switch control signal Ct1 to control the duty cycle of the power switch 105, thus adjusting the second output voltage VOH. In one embodiment, the first switch control signal Ct1 is configured to control the power switch 105 to be turned on periodically based on a clock signal Clk, and configured to control the power switch 105 to be turned off according to the second error amplifying signal VCM2, the second switch control signal Ct2 is configured to control the first output switch 106 to be turned on based on an off moment of the power switch 105, and configured to control the first output switch 106 to be turned off according to the first error amplifying signal VCM1. In another embodiment, the first switch control signal CO is configured to control the power switch 105 to be turned on periodically based on the clock signal Clk, and configured to control the power switch 105 to be turned off according to the second error amplifying signal VCM2; When the power switch 105 is off, the second switch control signal Ct2 is configured to control the first output switch 106 to be turned on according to the first error amplifying signal VCM1, and configured to control the first output switch 106 to be turned off according to the clock signal Clk. In one embodiment, the second output switch 107 is configured to be turned on and off based on the switching states of the first output switch 106 and the power switch 105. For example, when the power switch 105 or the first output switch 106 is on, the second output switch 107 is configured to be off, and when the power switch 105 and the first output switch 106 are off, the second output switch 107 is configured to be on.

In the embodiment as shown in FIG. 2, the logic circuit 133 comprises a first flip-flop circuit FF1, an inverting circuit N1, an AND gate circuit A1 and a second flip-flop circuit FF2. The second flip-flop circuit FF2 has a set terminal S, a reset terminal R and an output terminal Q, wherein the set terminal S is configured to receive the clock signal Clk, the reset terminal R is configured to receive the second duty cycle signal D2, the output terminal Q is configured to output the first switch control signal Ct1. The second flip-flop circuit FF2 is configured to turn on the power switch 105 periodically based on the clock signal Clk, and configured to modulate a pulse width of the first switch control signal Ct1 based on the second duty cycle signal D2, thus controlling a turn-off moment of the power switch 105, i.e. controlling an on duration during one switching period of the power switch 105. The AND gate circuit A1 has a first input terminal, a second input terminal and an output terminal, wherein the first input terminal is configured to receive the first duty cycle signal D1, the second input terminal is configured to receive an inverting signal of the first switch control signal Ct1. The first flip-flop circuit FF1 has a set terminal S, a reset terminal R and an output terminal Q, wherein the set terminal S is coupled to the output terminal of the AND gate circuit A1, the reset terminal R is configured to receive the clock signal Clk, the output terminal Q is configured to output the second switch control signal Ct2. When the power switch 105 is off, the first flip-flop circuit FF1 is configured to modulate a pulse width of the second switch control signal Ct2 based on the first duty cycle signal D1, thus controlling a turn-on moment of the first output switch 106, i.e. controlling an on duration during one switching period of the first output switch 106; The flip-flop circuit FF1 is configured to control the turn-on moment of the first output switch 106 based on the clock signal Clk. Otherwise, the switching period is equal to a period of the clock signal Clk.

As persons of ordinary skill in the art know, the logic circuit 133 is not confined to be the embodiments shown in FIG. 2, and appropriate logic circuits may also be used to realize the logic relationships of the first duty cycle signal D1, the second duty cycle signal D2, the first switch control signal Ct1 and the second switch control signal Ct2 without detracting from the merits of the present invention.

In the embodiment as shown in FIG. 2, peak current control method is as an example to illustrate a control method for the LED driving system 100, but one of ordinary skill in the art should know that other control methods can also be used in other embodiments, e.g. voltage control method and average current control method.

Figure 3:
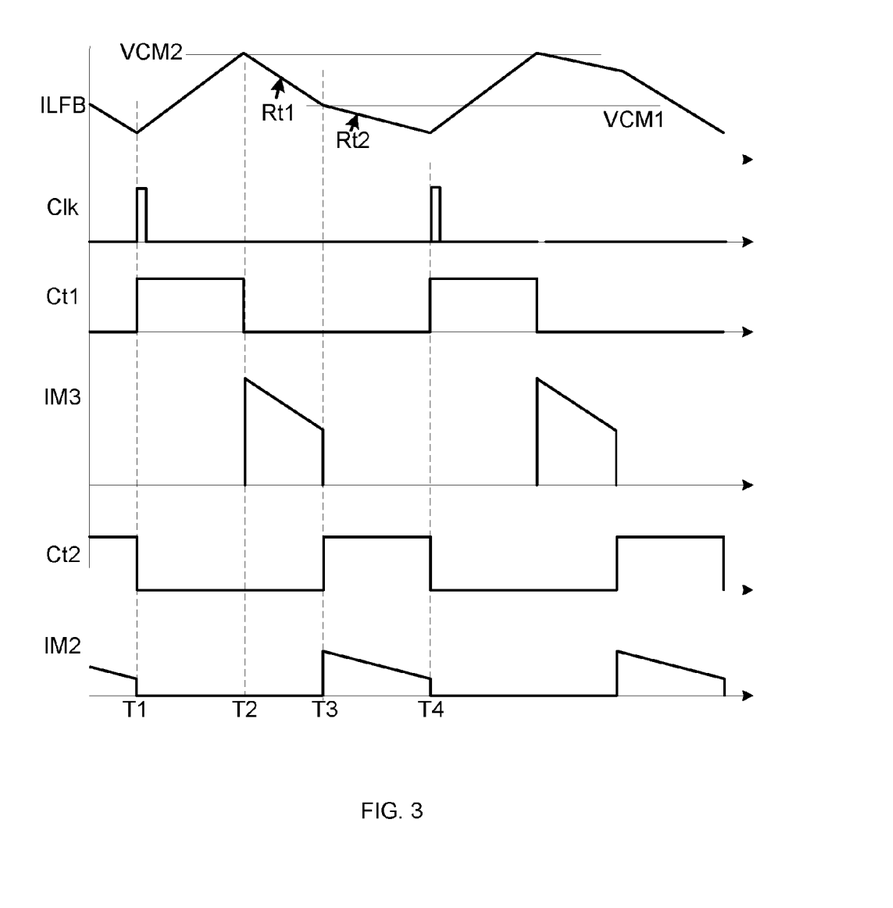
FIG. 3 schematically shows waveforms of the LED driving system 100 according to an embodiment of the present invention.

FIG. 3 schematically shows waveforms of the LED driving system 100 according to an embodiment of the present invention. Waveforms of which shown in FIG. 3 from up to bottom are inductor current feedback signal ILFB, clock signal Clk, first switch control signal Ct1, current IM3 flowing through the second output switch 107, second switch control signal Ct2 and current IM2 flowing through the first output switch 106. Associated with FIG. 1, FIG. 2, and FIG. 3, typical operation of the LED driving system 100 is illustrated below.

At the moment of T1, the clock signal Clk is configured to turn to high level from low level, the first output switch 106 is configured to be turned off according to the second switch control signal Ct2, the power switch 105 is configured to be turned on according to the first switch control signal Ct1, the inductor current IL is configured to increase and the inductor L1 is configured to store energy. When the power switch 105 is on, the first output switch 106 and the second output switch 107 are off. Until to the moment of T2, the inductor current feedback signal ILFB increases to be larger than the second error amplifying signal VCM2, the first switch control signal Ct1 is configured to control the power switch 105 to be turned off based on the second duty cycle signal D2. During the period from the moment T2 to the moment T3, the power switch 105 and the first output switch 106 are configured to keep off, the second output switch 107 is on, e.g. the diode Di1 is on, the LED driving system 100 is configured to supply power for the second output capacitor Co2, the LED string 12_1 and the LED string 12_2. The inductor current IL is configured to decrease with a first slope Rt1, the current IM3 which flows through the second output switch 107 is equal to the inductor current IL. At the moment of T3, the inductor current feedback signal ILFB decreases to be smaller than the first error amplifying signal VCM1, the second switch control signal Ct2 is configured to control the first output switch 106 to be turned on according to the first duty cycle signal D1. During the moment T3 to the moment T4, the second output switch 107 is off, e.g. the second diode Di1 is off, the inductor L1 is configured to release energy to the first output terminal 102 via the first output switch 106, the LED driving system 100 is configured to supply power for the first output capacitor Co1, the LED string 11_1 and the LED string 11_2. The inductor current IL is configured to decrease with a second slope Rt2, the current IM2 which flows through the first output switch 106 is equal to the inductor current IL. The second slope Rt2 is smaller than the first slope Rt1. Until to the moment T4, the clock signal Clk is configured to turn to high level from low level, the first output switch 106 is configured to be turned off and the power switch 105 is configured to be turned on. So repeated.

When the first output voltage VOL is configured to decrease, the cathode voltage VLED1 and the cathode voltage VLED2 are configured to decrease, the first error amplifying signal VCM1 is configured to increase, the turn-on moment of the first output switch 106 is configured to be advanced, thus increasing an on duration (T4–T3) of the first output switch 106 during one switching period (T4–T1) and increasing a duty cycle (T4–T3)/(T4–T1) of the first output switch 106. On the contrary, when the first output voltage VOL is configured to increase, the cathode voltage VLED1 and the cathode voltage VLED2 are configured to increase, the first error amplifying signal VCM1 is configured to decrease, the turn-on moment of the first output switch 106 is configured to be delayed, thus decreasing the on duration (T4–T3) of the first output switch 106 during one switching period (T4–T1) and decreasing the duty cycle (T4–T3)/(T4–T1) of the first output switch 106. When the second output voltage VOH is configured to decrease, the cathode voltage VLED3 and the cathode voltage VLED4 are configured to decrease, the second error amplifying signal VCM2 is configured to increase, the turn-on moment of the power switch 105 is configured to be delayed, thus increasing an on duration (T2–T1) of the power switch 105 in one switching period (T4–T1) and increasing a ratio (T2–T1)/(T4–T1) of the power switch 105. On the contrary, when the second output voltage VOH is configured to increase, the cathode voltage VLED3 and the cathode voltage VLED4 are configured to increase, the second error amplifying signal VCM2 is configured to decrease, the turn-off moment of the power switch 105 is configured to be advanced, thus decreasing the on duration (T2–T1) of the power switch 105 in one period and increasing the ratio (T2–T1)/(t4–T1).

A person ordinary skilled in the art should know that the periods T1-T2, T2-T3 and T3-T4 can comprise a dead time.

Figure 4:
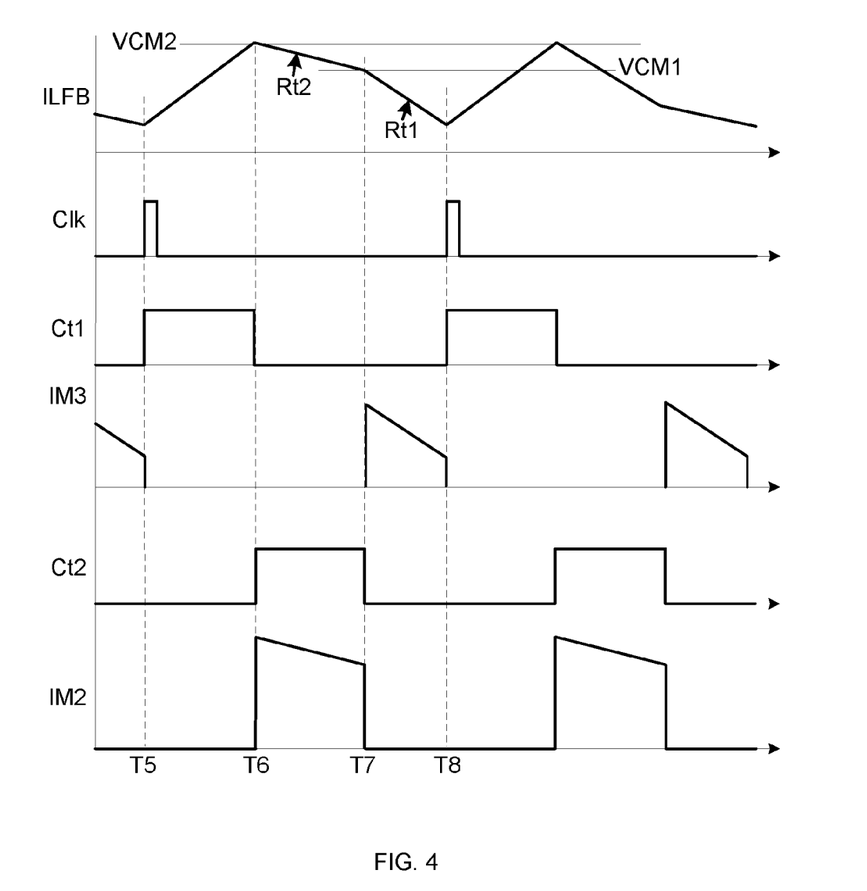
FIG. 4 schematically shows waveforms of the LED driving system 100 according to another embodiment of the present invention.

In the embodiment as shown in FIG. 3, in one period of the LED driving system 100, each switch is configured to be turned on as the following sequence: firstly the power switch 105, secondly the second output switch 107, thirdly the first output switch 106; so repeated. A person ordinary skilled in the art should understand that the sequence is not confined to the embodiment shown in FIG. 3. For example, in the embodiment as shown in FIG. 4, each switch is configured to be turned on as the following sequence: firstly the power switch 105, secondly the first output switch 106, thirdly the second output switch 107; So repeated.

FIG. 4 schematically shows waveforms of the LED driving system 100 according to another embodiment of the present invention. From up to bottom, waveforms of which shown in FIG. 4 are: the inductor current feedback signal ILFB, the clock signal Clk, the first switch control signal Ct1, the current IM3 flowing through the second switch 107, the second switch control signal Ct2 and the current IM2 which flows through the first output switch 106. At the moment of T5, the clock signal Clk is configured to turn to high level from low level, the power switch 105 is configured to be turned on according to the first switch control signal Ct1, the inductor current IL is configured to increase, the inductor L1 starts to store energy. During the time period that the power switch 105 is on, the first output switch 106 and the second output switch 107 are configured to be off. Until to the moment of T6, the inductor current feedback signal ILFB increases to be larger than the second error amplifying signal VCM2, the first switch control signal Ct1 is configured to control the power switch 105 to be turned off according to the second duty cycle signal D2. The second switch control signal Ct2 is configured to control the first output switch 106 to be turned on, the second output switch 107 is configured to keep off, the LED driving system 100 is configured to supply power for the first output capacitor Co1, the LED string 11_1 and the LED string 11_2 via the first output switch 106. The inductor current IL is equal to the current IM2 flowing through the first output switch 106 and is configured to decrease with the second slope Rt2. At the moment of T7, the inductor current feedback signal ILFB decreases to be smaller than the first error amplifying signal VCM1, the second switch control signal Ct2 is configured to control the first output switch 106 to be turned off according to the first duty cycle signal D1, the second output switch 107 is configured to be turned on, the inductor current IL is configured to supply power for the second capacitor Co2, the LED string 12_1 and the LED string 12_2 via the second output switch 107. The inductor current IL is equal to the current IM3 flowing through the second output switch 107 and is configured to decrease with the first slope Rt1. Until to the moment of T8, the clock signal Clk is configured to turn to high level from low level, the second output switch 107 is configured to be turned off, the first switch control signal Ct1 is configured to control the power switch 105 to be turned on; So repeated.

A person ordinary skilled in the art should know that the periods T5-T6, T6-T7 and T7-T8 can comprise a dead time.

Figure 5:
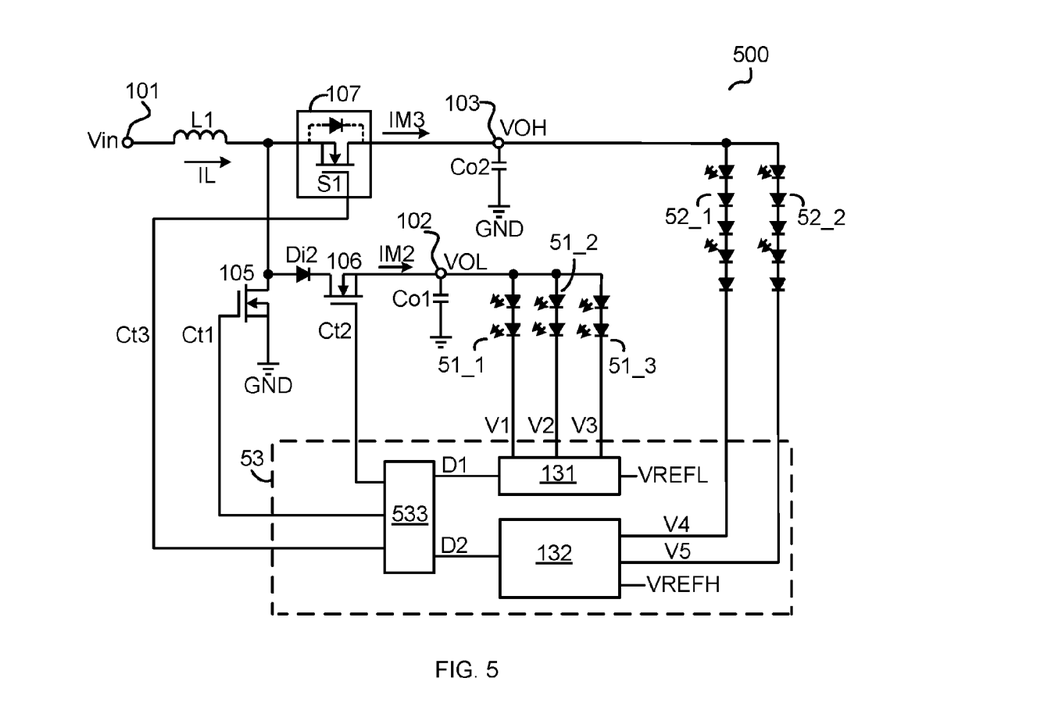
FIG. 5 schematically illustrates a LED driving system 500 according to another embodiment of the present invention.

FIG. 5 schematically illustrates a LED driving system 500 according to another embodiment of the present invention. In the embodiment as shown in FIG. 5, the second output switch 107 is a synchronous rectifier switch. The power switch 105, the first output switch 106 and the second output switch 107 are N-type MOSFETs in the embodiment as shown in FIG. 5, but a person of ordinary skill in the art should know that other kinds of semiconductor devices can also be used in the present invention. In one embodiment as shown in FIG. 5, the first LED array comprises a LED string 51_1, a LED string 51_2 and a LED string 51_3, wherein the first output voltage VOL is configured to supply power for the first LED array, the second LED array comprises a LED string 52_1 and a LED string 52_2, wherein the second output voltage VOH is configured to supply power for the second LED array. The control circuit 53 is configured to control the duty cycle of the first output switch 106 according to the LED string 51_1, the LED string 51_2 and the LED string 51_3, thus adjusting the first output voltage VOL. The control circuit 53 is configured to control the duty cycle of the power switch 105 according to the LED string 52_1 and the LED string 52_2, thus adjusting the second output voltage VOH.

In the embodiment as shown in FIG. 5, the control circuit 53 comprises a first duty cycle control loop 131, a second duty cycle control loop 132 and a logic circuit 533. In one embodiment, the first duty cycle control loop 131 is configured to receive a cathode voltage V1 of the LED string 51_1, a cathode voltage V2 of the LED string 51_2, a cathode voltage V3 of the LED string 51_3 and the first reference signal VREFL. The first duty cycle control loop 131 is configured to produce the first duty cycle D1 according to a difference value VREFL−min(V1, V2, V3) of the first reference signal VREFL and a minimum value of the cathode voltage V1, the cathode voltage V2 and the cathode voltage V3, wherein "min" means an operation of taking the minimum value. In one embodiment, the second duty cycle control loop 132 is configured to receive a cathode voltage V4 of the LED string 52_1, a cathode voltage V5 of the LED string 52_2 and the second reference signal VREFH. And the duty cycle control loop 132 is configured to produce the duty cycle signal D2 according to a difference value VREFH−min(V4, V5) of the second reference signal VREFH and a minimum value of the cathode voltage V4 and the cathode voltage V5. The logic circuit 533 is configured to receive the first duty cycle signal D1 and the second duty cycle signal D2, and is configured to produce the first switch control signal Ct1, the second switch control signal Ct2 and a third switch control signal Ct3 to respectively control the power switch 105, the first output switch 106 and the second output switch 107. In one embodiment, the logic circuit 533 is configured to control the duty cycle of the first output switch 106 according to the first duty cycle signal D1, thus adjusting the first output voltage VOL, i.e. adjusting the power which the LED driving system 500 supplies for the first LED array, the logic circuit 533 is configured to control the duty cycle of the power switch 105 according to the second duty cycle signal D2, thus adjusting the second output voltage VOH, i.e. adjusting the power which the LED driving system 500 supplies for the second LED array. In one embodiment, the logic circuit 533 is configured to control the second output switch 107 according to switching states of the power switch 105 and the first output switch 106. In one embodiment, when the power switch 105 is on, the logic circuit 533 is configured to control the first output switch 106 and the second output switch 107 to keep off; when the power switch 105 is off, the logic circuit 533 is configured to control the second output switch 107 and the first output switch 106 to be turned on and off alternately. For example, the logic circuit 533 is configured to control the second output switch 107 to be turned on at the moment of the power switch 105 being turned off, and is configured to control the second output switch 107 to be turned off before the first output switch 106 is turned on. For example, the logic circuit 533 is configured to turn on the second output switch 107 according to the turn-off moment of the first output switch 106 and configured to turn off the second output switch 107 before the power switch 106 is turned on.

A person of ordinary skill in the art should know that circuits which used to produce the first switch control signal Ct1 and the second switch control signal Ct2 in the logic circuit 533 can also be used in the logic circuit 133. Similarly, circuits which used to produce the first control signal Ct1 and the second control signal Ct2 in the logic circuit 133 can also be used in the logic circuit 533.

Figure 6:
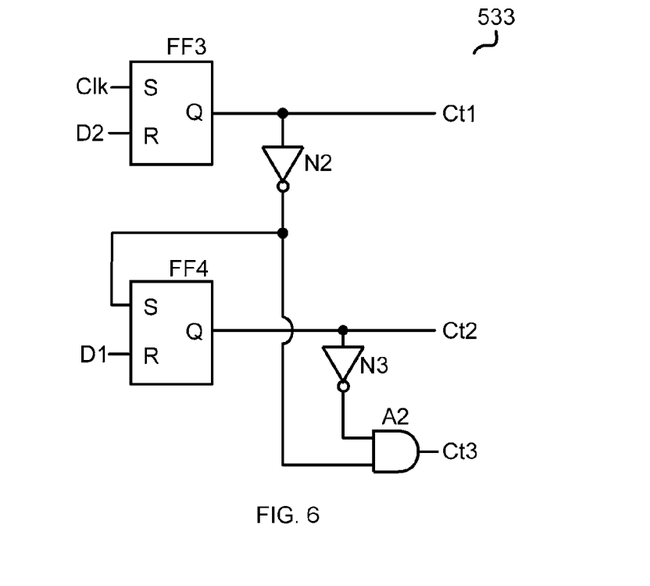
FIG. 6 schematically illustrates a logic circuit 533 according to an embodiment of the present invention.

FIG. 6 schematically illustrates a logic circuit 533 according to an embodiment of the present invention. In the embodiment as shown in FIG. 6, the logic circuit 533 comprises a flip-flop circuit FF3, a flip-flop circuit FF4, an inverting circuit N2, an inverting circuit N3 and an AND gate circuit A2. The flip-flop circuit FF3 has a set terminal S, a reset terminal R and an output terminal Q, wherein the set terminal S is configured to receive the clock signal Clk, the reset terminal R is configured to receive the second duty cycle signal D2, the output terminal Q is configured to provide the first switch control signal Ct1. The flip-flop circuit FF3 is configured to turn on the power switch 105 according to the period of the clock signal Clk and configured to turn off the power switch 105 according to the second duty cycle signal D2, thus controlling the duty cycle of the power switch 105. The flip-flop circuit FF4 has a set terminal S, a reset terminal R and an output terminal Q, wherein the set terminal S is coupled to the output terminal Q of the flip-flop circuit FF3 via the inverting circuit N2 in order to receive an inverting signal of the first switch control signal Ct1, the reset terminal R is configured to receive the first duty cycle D1, the output terminal Q is configured to provide the second switch control signal Ct2. The flip-flop circuit FF4 is configured to turn on the first output switch 106 according to the turn-off moment of the power switch 105, and configured to turn off the first output switch 106 according to the first duty cycle D1, thus controlling the duty cycle of the first output switch 106. The logic circuit 533 is configured to provide the third switch control signal Ct3 according to the first switch control signal Ct1 and the second switch control signal Ct2 so that when the power switch 105 is off, the first output switch 106 and the second output switch 107 are configured to be turned on alternately. In the embodiment as shown in FIG. 6, the AND gate A2 has a first input terminal, a second input terminal and an output terminal, wherein the first input terminal is configured to receive the inverting signal of the first switch control signal Ct1 via the inverting circuit N2, the second input terminal is configured to receive an inverting signal of the second switch signal Ct2 via the inverting circuit N3, the output terminal is configured to provide the third switch control signal Ct3.

A person of ordinary skill in the art should know that the logic circuit 533 is not confined to the embodiment shown in FIG. 6. Other appropriate logic circuits can also be used to realize the logic relationship of the first duty cycle Dt1, the second duty cycle Dt2, the first switch control signal Ct1, the second switch control signal Ct2 and the third switch control signal Ct3.

Figure 7:
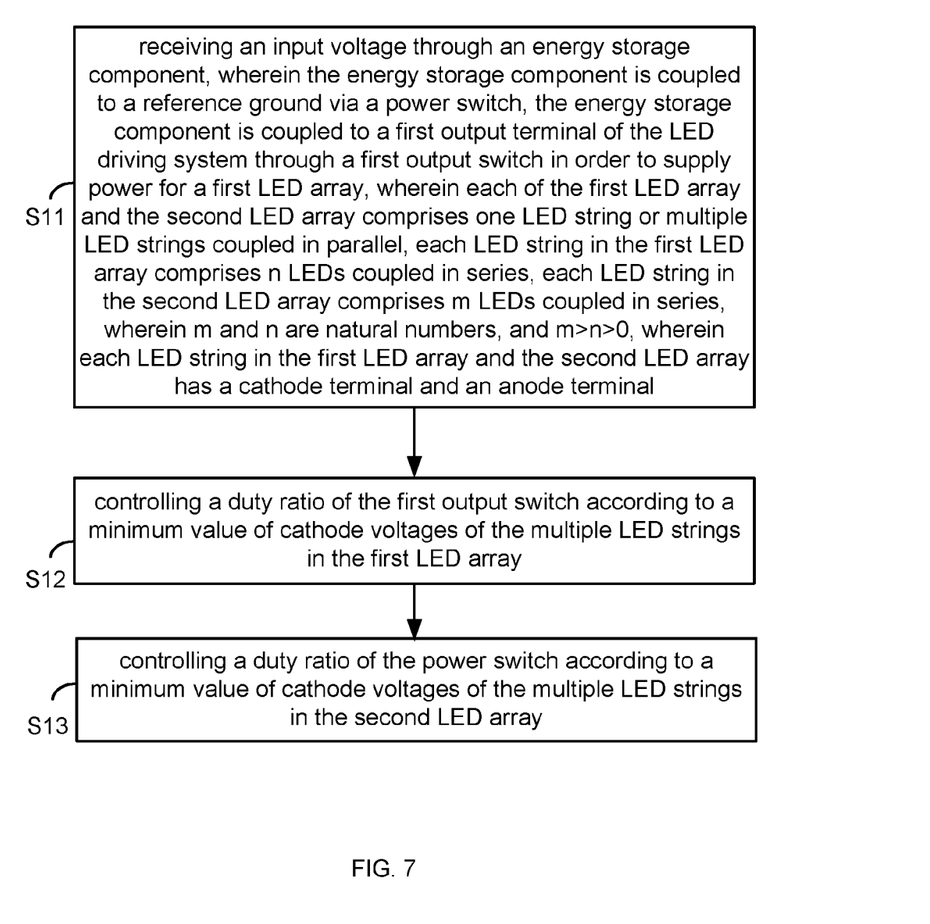
FIG. 7 shows a flow chart illustrating a control method for a LED driving system according to an embodiment of the present invention.

FIG. 7 shows a flow chart illustrating a control method for a LED driving system according to an embodiment of the present invention. The LED driving system has an input terminal configured to receive an input voltage and an output terminal configured to provide an output voltage. The control method comprises steps S11-S13.

At the step S11, receiving the input voltage through an energy storage component, wherein the energy storage component is coupled to a reference ground through a power switch, coupled to a first output terminal through a first output switch to supply power for a first LED array, and coupled to a second output terminal through a second output switch to supply power for a second LED array, wherein each of the first LED array and the second LED array comprises one LED string or multiple LED strings coupled in parallel, each LED string in the first LED array comprises n LEDs coupled in series, each LED string in the second LED array comprises m LEDs coupled in series, wherein m and n are natural numbers, and m>n>0, wherein each LED string in the first LED array and the second LED array has a cathode terminal and an anode terminal.

At the step S12, controlling a duty cycle of the first output switch according to a minimum value of voltages at the cathode terminals of the multiple LED strings in the first LED array.

At the step S13, controlling a duty cycle of the power switch according to a minimum value of voltages at the cathode terminals of the multiple strings in the second LED array.

Note that in the flow chart described above, the box functions may also be implemented with different orders as shown in FIG. 7. For example, two successive box functions may be executed meanwhile, or sometimes the box functions may be executed in reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A LED driving system, having an input terminal configured to receive an input voltage, a first output terminal configured to provide a first output voltage for a first LED array, and a second output terminal configured to provide a second output voltage for a second LED array, wherein each of the first LED array and the second LED array comprises multiple LED strings coupled in parallel, wherein each of the LED strings in the first LED array has a cathode terminal and an anode terminal, and each of the LED strings in the second LED array has a cathode terminal and an anode terminal, the LED driving system comprising:

an energy storage component, having a first terminal and a second terminal, wherein the first terminal is coupled to the input terminal of the LED driving system to receive the input voltage;

a power switch, coupled between the second terminal of the energy storage component and a reference ground;

a first output switch, coupled between the second terminal of the energy storage component and the first output terminal of the LED driving system; and a second output switch, coupled between the second terminal of the energy storage component and the second output terminal of the LED driving system; wherein when the power switch is on, the energy storage component is configured to store energy, when the power switch is off, the energy storage component is configured to release energy to the first output terminal and the second output terminal of the LED driving system alternately, wherein according to a minimum value of voltages at the cathode terminals of the multiple LED strings in the first LED array, the LED driving system is configured to control a duty cycle of the first output switch to adjust the first output voltage, and according to a minimum value of voltages at the cathode terminals of the multiple LED strings in the second LED array, the LED driving system is configured to control a duty cycle of the power switch to adjust the second output voltage, wherein the second output voltage is larger than the first output voltage.

2. The LED driving system of claim 1, wherein the second output switch is configured to be turned on or off according to switching states of the power switch and the first output switch.

3. The LED driving system of claim 2, wherein when the power switch is on, the first output switch and the second output switch are configured to be off, when the power switch is off and the first output switch is on, the second output switch is configured to be off, and when the power switch and the first output switch are off, the second output switch is configured to be on.

4. The LED driving system of claim 1, wherein energy released to the first output terminal is configured to increase when the duty cycle of the first output switch increases.

5. The LED driving system of claim 1, wherein the second output switch comprises a diode or a synchronous rectifier switch.

6. The LED driving system of claim 1, wherein each of the LED strings in the first LED array comprises n LEDs coupled in series, each of the LED strings in the second LED array comprises m LEDs coupled in series, m and n are natural numbers, m and n are larger than zero, and m is larger than n.

7. The LED driving system of claim 1, further comprising a control circuit, wherein the control circuit comprises:

a first duty cycle control loop, coupled to the first LED array, and configured to produce a first duty cycle signal according to a first reference signal and the minimum value of voltages at the cathode terminals of the multiple LED strings in the first LED array;

a second duty cycle control loop, coupled to the second LED array, and configured to produce a second duty cycle signal according to a second reference signal and the minimum value of the voltages at the cathode terminals of the multiple LED strings in the second LED array; and a logic circuit, configured to receive the first duty cycle signal and the second duty cycle signal, and configured to produce a first switch control signal and a second switch control signal, wherein the first switch control signal is configured to control the duty cycle of the power switch, and the second switch control signal is configured to control the duty cycle of the first output switch.

8. The LED driving system of claim 7, wherein the logic circuit is configured to produce a third switch control signal to control the second output switch.

9. The LED driving system of claim 7, wherein the first duty cycle control loop comprises:

a first minimum value choosing circuit, configured to receive the cathode voltages of the multiple LED strings in the first LED array, and configured to produce a first minimum value signal according to the minimum value of the voltages at the cathode terminals of the multiple LED strings in the first LED array;

a first error amplifying circuit, configured to receive the first reference signal and the first minimum value signal, and configured to produce a first error amplifying signal according to a difference value of the first reference signal and the first minimum value signal; and a first comparator circuit, configured to receive the first error amplifying signal and a current feedback signal which represents a current of the energy storage component, and configured to produce the first duty cycle signal according to the first error amplifying signal and the current feedback signal.

10. The LED driving system of claim 7, wherein the second duty cycle control loop comprises:

a second minimum value choosing circuit, configured to receive the cathode voltages of the multiple LED strings in the second LED array, and configured to produce a second minimum value signal according to the minimum value of the voltages at the cathode terminals of the multiple LED strings in the second LED array;

a second error amplifying circuit, configured to receive the second reference signal and the second minimum value signal, and configured to produce a second error amplifying signal according to a difference value of the second reference signal and the second minimum value signal; and a second comparator circuit, configured to receive the second error amplifying signal and a current feedback signal which represents a current of the energy storage component, and configured to produce the second duty cycle signal according to the second error amplifying signal and the current feedback signal.

11. The LED driving system of claim 7, wherein the logic circuit comprises:

a first flip-flop circuit, having a set terminal, a reset terminal and an output terminal, wherein the set terminal is configured to receive a clock signal, the reset terminal is configured to receive the second duty cycle signal, and the output terminal is configured to provide the first switch control signal to control the power switch;

an inverting circuit, coupled to the output terminal of the first flip-flop circuit to receive the first switch control signal, and configured to provide an inverting signal of the first switch control signal;

an AND gate circuit, having a first input terminal, a second input terminal and an output terminal, wherein the first input terminal is configured to receive the first duty cycle signal, and the second input terminal is configured to receive the inverting signal of the first switch control signal; and a second flip-flop circuit, having a set terminal, a reset terminal and an output terminal, wherein the set terminal is coupled to the output terminal of the AND gate, the reset terminal is configured to receive the clock signal, and the output terminal is configured to provide the second switch control signal to control the first output switch.

12. The LED driving system of claim 7, wherein the logic circuit comprises:

a first flip-flop circuit, having a set terminal, a reset terminal and an output terminal, wherein the set terminal is configured to receive a clock signal, the reset terminal is configured to receive the second duty cycle signal, and the output terminal is configured to provide the first switch control signal to control the power switch;

a first inverting circuit, configured to receive the first switch control signal through its input terminal, and configured to provide an inverting signal of the first switch control signal through its output terminal;

a second flip-flop circuit, having a set terminal, a reset terminal and an output terminal, wherein the set terminal is configured to receive the inverting signal of the first switch control signal, the reset terminal is configured to receive the first duty cycle signal, and the output terminal is configured to provide the second switch control signal to control the first output switch;

a second inverting circuit, configured to receive the second switch control signal through its input terminal, and configured to provide an inverting signal of the second switch control signal through its output terminal; and an AND gate circuit, having a first input terminal, a second input terminal and an output terminal, wherein the first input terminal is configured to receive the inverting signal of the first control signal, the second input terminal is configured to receive the inverting signal of the second switch control signal, and the output terminal is configured to provide a third switch control signal to control the second output switch.

13. A LED driving system, having a first output terminal and a second output terminal, wherein the first output terminal is configured to supply power for a first LED string and a second LED string, the second output terminal is configured to supply power for a third LED string and a fourth LED string, wherein each of the first LED string, the second LED string, the third LED string and the fourth LED string has a cathode terminal and an anode terminal, the LED driving system comprising:

an energy storage component configured to receive an input voltage through its first terminal;

a power switch coupled between a second terminal of the energy storage component and a reference ground;

a first output switch coupled between the second terminal of the energy storage component and the first output terminal of the LED driving system;

a second output switch coupled between the second terminal of the energy storage component and the second output terminal of the LED driving system; and a control circuit, configured to control a duty cycle of the first output switch according to a minimum value of voltages at the cathode terminals of the first LED string and the second LED string, and configured to control a duty cycle of the power switch according to a minimum value of voltages at the cathode terminals of the third LED string and the fourth LED string; wherein the first LED string comprises n LEDs coupled in series, the second LED string comprises n LEDs coupled in series, the third LED string comprises m LEDs coupled in series, the fourth LED string comprises m LEDs coupled in series, both m and n are natural numbers, m and n are larger than zero, and m is larger than n.

14. The LED driving system of claim 13, wherein the control circuit further comprises:

a first duty cycle control loop, coupled to the first LED string and the second LED string, and configured to produce a first duty cycle signal according to a first reference signal and the minimum value of voltages at the cathode terminals of the first LED string and the second LED string;

a second duty cycle control loop, coupled to the third LED string and the fourth LED string, and configured to produce a second duty cycle signal according to a second reference signal and the minimum value of voltages at the cathode terminals of the third LED string and the fourth LED string; and a logic circuit, configured to receive the first duty cycle signal and the second duty cycle signal, configured to produce a first switch control signal according to the second duty cycle signal, and configured to produce a second switch control signal according to the first duty cycle signal, wherein the first switch control signal is configured to control the power switch, the second switch control signal is configured to control the first output switch.

15. The LED driving system of claim 14, wherein:

the first switch control signal is configured to control the power switch to be turned on periodically according to a clock signal, configured to control the power switch to be turned off according to a comparing result of the second reference signal and the minimum value of the voltages at the cathode terminals of the first LED string and the second LED string; and the second switch control signal is configured to control the first output switch to be turned on according to a turn-off moment of the power switch, configured to control the first output switch to be turned off according to a comparing result of the first reference signal and the minimum value of the voltages at the cathode terminals of the third LED string and the fourth LED string.

16. The LED driving system of claim 14, wherein:

the first switch control signal is configured to control the power switch to be turned on periodically according to a clock signal, configured to control the power switch to be turned off according to a comparing result of the second reference signal and the minimum value of the voltages at the cathode terminals of the third string and the fourth string; and the second switch control signal is configured to control the first output switch to be turned on according to a turn-off moment of the power switch, configured to control the first output switch to be turned off according to a comparing result of the first reference signal and the minimum value of the voltages at the cathode terminals of the first LED string and the second LED string.

17. A control method for a LED driving system, comprising:

receiving an input voltage through an energy storage component, wherein the energy storage component is coupled to a reference ground via a power switch, the energy storage component is coupled to a first output terminal of the LED driving system via a first output switch in order to supply power for a first LED array, and the energy storage component is coupled to a second output terminal of the LED driving system through a second output switch in order to supply power for a second LED array, wherein the first LED array comprises multiple LED strings coupled in parallel, the second LED array comprises multiple LED strings coupled in parallel, wherein each of the LED strings in the first LED array has a cathode terminal and an anode terminal, and each of the LED stings in the second array has a cathode terminal and an anode terminal;

controlling a duty cycle of the first output switch according to a minimum value of voltages at the cathode terminals of the multiple LED strings in the first LED array; and controlling a duty cycle of the power switch according to a minimum value of voltages at the cathode terminals of the multiple LED strings in the second LED array.

18. The control method for a LED driving system of claim 17, further comprising: controlling the second output switch to be turned on or off according to switching states of the first output switch and the power switch.

19. The control method for a LED driving system of claim 18, wherein when the power switch is on, controlling the first output switch and the second output switch to be off, when the power switch is off and the first output switch is on, controlling the second output switch to be off, and when the power switch and the first output switch are off, controlling the second output switch to be on.

20. The control method for a LED driving system of claim 17, wherein each LED string in the first LED array comprises n LEDs coupled in series, each LED string in the second LED array comprises m LEDs coupled in series, m and n are natural numbers, m and n are larger than zero, and m is larger than n.

* * * * *

UNITED STATES PATENT AND TRADEMARK OFFICE
CERTIFICATE OF CORRECTION

PATENT NO. : 10,091,846 B2  
APPLICATION NO. : 15/628575  
DATED : October 2, 2018  
INVENTOR(S) : Bairen Liu Page 1 of 1

It is certified that error appears in the above-identified patent and that said Letters Patent is hereby corrected as shown below:

On the Title Page

Item (12) should read: Liu et al.

Item (72) under "Inventors", please insert inventors --Bo Yu, Hangzhou (CN)-- and --Licheng Sheng, Hangzhou (CN)--.

Signed and Sealed this  
Third Day of May, 2022

Katherine Kelly Vidal  
*Director of the United States Patent and Trademark Office*